(12) United States Patent
Yan et al.

(10) Patent No.: US 12,449,841 B2
(45) Date of Patent: Oct. 21, 2025

(54) DEVICES WITH DETACHABLE HEADBANDS

(71) Applicant: Apple Inc., Cupertino, CA (US)

(72) Inventors: Toria F. Yan, San Jose, CA (US); Ryan M. David, San Francisco, CA (US); Ryan Fernandez, San Francisco, CA (US); Tingqing Liao, Shenzhen (CN); Yunhe Huang, Pleasanton, CA (US); Bingda Liu, Shenzhen (CN); Hao Zhu, San Jose, CA (US); Lauren D. Gerardi, Redwood City, CA (US); Benjamin A. Shaffer, San Jose, CA (US); Robert V. Tang, San Francisco, CA (US); Richard P. Howarth, San Francisco, CA (US); Nicolas Lylyk, Los Gatos, CA (US); Thomas Richard Routh, Pemberton (CA); Alex Warburton, Squamish (CA); Uwe Michael Homm, Squamish (CA); James Russell Griffin, Squamish (CA); Michael Scott Pritchett, Pemberton (CA); Kathryn Lorraine Pritchett, Pemberton (CA); Sion Gwynn, Whistler (CA)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 17/870,647

(22) Filed: Jul. 21, 2022

(65) Prior Publication Data
US 2024/0028072 A1    Jan. 25, 2024

(51) Int. Cl.
*G06F 1/16*     (2006.01)
*A41D 20/00*    (2006.01)
*G02B 27/01*    (2006.01)

(52) U.S. Cl.
CPC .............. *G06F 1/163* (2013.01); *A41D 20/00* (2013.01); *G02B 27/0176* (2013.01);
(Continued)

(58) Field of Classification Search
CPC ........ G02B 27/0176; G02B 2027/0154; G02B 27/0179; G02B 2027/0187; G06F 1/1607;
(Continued)

(56) References Cited

U.S. PATENT DOCUMENTS 2,494,750 A * 1/1950 Fornicoia ................ G02C 3/003 D28/41
3,816,005 A * 6/1974 Kirschner ............ G05D 1/0676 2/6.2
(Continued)

FOREIGN PATENT DOCUMENTS

CN    204631356 U * 9/2015
CN    205004230 U * 1/2016 ............. H01H 13/85
(Continued)

*Primary Examiner* — Allen L Parker
*Assistant Examiner* — Martin Antonio Asmat Uceda
(74) *Attorney, Agent, or Firm* — Treyz Law Group, P.C.; G. Victor Treyz; David K. Cole

(57) ABSTRACT

A head-mounted device may have a head-mounted housing containing rear-facing displays that display images for a user when the head-mounted housing is worn by the user. The head-mounted device housing may have housing structures such as elongated housing members with protruding posts. A headband may be removably coupled to the head-mounted device housing. The headband may have a strap with openings configured to receive the posts. Releasable latches may be provided to allow selective engagement and disengagement between the headband and the housing. The latches may contain movable latch members that are biased using magnetic biasing mechanisms, spring-based biasing mechanisms, or other biasing mechanisms. To release each latch, a tab, button, toggle lever, slider, or other release mecha-
(Continued)

nisms may be actuated by a user. This moves the movable latch member from a closed latch position to an open latch position that releases the headband from the housing.

14 Claims, 13 Drawing Sheets

(52) U.S. Cl.
CPC ....... *G02B 27/0179* (2013.01); *G06F 1/1607* (2013.01); *G06F 1/1679* (2013.01); *G02B 2027/0154* (2013.01); *G02B 2027/0187* (2013.01)

(58) Field of Classification Search
CPC ....... G06F 1/163; G06F 1/1679; A41D 20/00; A45C 13/30; G02C 3/006
See application file for complete search history.

(56) References Cited

U.S. PATENT DOCUMENTS

| | | | | |
|---|---|---|---|---|
| 4,042,974 | A * | 8/1977 | Morgan | A42B 3/326 2/9 |
| 4,479,703 | A * | 10/1984 | Enghofer | G02C 5/143 351/123 |
| 4,657,364 | A * | 4/1987 | Murrell | G02C 3/003 351/123 |
| 4,686,712 | A * | 8/1987 | Spiva | A61F 9/027 2/202 |
| 4,713,844 | A * | 12/1987 | Westgate | A42B 3/326 2/424 |
| 4,918,753 | A * | 4/1990 | Mermillod | A42B 3/185 2/10 |
| 5,002,381 | A * | 3/1991 | Murrell | G02C 5/00 351/123 |
| 5,259,093 | A * | 11/1993 | D'Annunzio | A41D 13/0002 24/3.9 |
| 5,987,652 | A * | 11/1999 | Fowler | A42B 3/185 2/452 |
| 6,160,666 | A * | 12/2000 | Rallison | G02B 27/283 359/632 |
| 6,490,729 | B1 * | 12/2002 | Dondero | A61F 9/02 2/10 |
| 6,845,548 | B1 * | 1/2005 | Lin | A42B 3/185 24/324 |
| 7,399,079 | B2 * | 7/2008 | Skuro | G02C 3/003 351/123 |
| 7,773,767 | B2 | 8/2010 | Wahl et al. | |
| 7,805,776 | B2 * | 10/2010 | Crossman | A42B 3/326 2/6.6 |
| 7,878,648 | B2 * | 2/2011 | Skuro | G02C 3/003 351/156 |
| 8,555,423 | B2 * | 10/2013 | Giroux | A42B 3/185 2/422 |
| 9,682,281 | B2 * | 6/2017 | Mestas | G16H 20/30 |
| 9,703,103 | B2 | 7/2017 | Araki et al. | |
| 9,946,077 | B2 * | 4/2018 | Kong | G02B 27/0179 |
| 9,997,286 | B2 * | 6/2018 | Herman | H01F 7/20 |
| 10,048,503 | B2 * | 8/2018 | Fujishiro | G06F 1/163 |
| 10,085,523 | B2 * | 10/2018 | Perkins | A44C 5/147 |
| 10,146,262 | B1 * | 12/2018 | Magrath | G06F 3/0304 |
| 10,317,682 | B2 * | 6/2019 | Drinkwater | G02B 27/0176 |
| 10,502,975 | B2 * | 12/2019 | Fulks | G02C 3/006 |
| 10,606,085 | B2 * | 3/2020 | Toyama | G06F 3/011 |
| 10,663,737 | B1 * | 5/2020 | Magrath | G02B 27/0176 |
| 10,670,870 | B2 | 6/2020 | Chueh et al. | |
| 10,712,573 | B2 * | 7/2020 | Jones | G02C 5/20 |
| 11,199,717 | B2 * | 12/2021 | Yoon | G02B 27/0093 |
| 11,320,659 | B1 * | 5/2022 | Kasar | G02B 27/0172 |
| 11,340,463 | B1 | 5/2022 | Bobuk | |
| 11,375,789 | B2 * | 7/2022 | Weber | F16B 1/00 |
| 11,442,280 | B2 * | 9/2022 | McCracken | G02B 27/0176 |
| 11,614,629 | B2 * | 3/2023 | Skelton | G02B 27/0176 345/8 |
| 11,719,944 | B2 * | 8/2023 | Bristol | H04R 1/1058 345/8 |
| 11,789,276 | B1 * | 10/2023 | Kasar | G02B 27/0176 359/630 |
| 2001/0036147 | A1 * | 11/2001 | Koester | G11B 21/16 |
| 2007/0130735 | A1 * | 6/2007 | Diamond | A44B 11/24 24/636 |
| 2008/0172778 | A1 * | 7/2008 | Lysogorski | A61F 9/028 2/436 |
| 2009/0300830 | A1 * | 12/2009 | Mage | A61F 9/025 2/452 |
| 2010/0283270 | A1 * | 11/2010 | Hood, III | G06F 1/1679 292/251.5 |
| 2010/0325784 | A1 * | 12/2010 | Abbott | A42B 3/04 2/422 |
| 2011/0150262 | A1 | 6/2011 | Nakama et al. | |
| 2011/0309121 | A1 * | 12/2011 | Dooley | A45C 7/0086 224/576 |
| 2013/0207437 | A1 | 8/2013 | Gottwald et al. | |
| 2013/0326790 | A1 | 12/2013 | Cauwels et al. | |
| 2016/0042897 | A1 * | 2/2016 | Qian | H01H 13/85 335/207 |
| 2016/0349509 | A1 * | 12/2016 | Lanier | G06F 3/012 |
| 2017/0242262 | A1 * | 8/2017 | Fuchs | G02B 30/34 |
| 2018/0203240 | A1 | 7/2018 | Jones et al. | |
| 2018/0314323 | A1 | 11/2018 | Mikhailov et al. | |
| 2019/0159354 | A1 | 5/2019 | Zheng et al. | |
| 2021/0304938 | A1 | 9/2021 | Kasar et al. | |
| 2023/0152594 | A1 * | 5/2023 | Davidson | G06F 1/203 359/601 |
| 2024/0184330 | A1 * | 6/2024 | Mossop | G06F 1/163 |

FOREIGN PATENT DOCUMENTS

| | | | |
|---|---|---|---|
| CN | 106444033 A | 2/2017 | |
| CN | 110221434 A | 9/2019 | |
| CN | 111538161 A | 8/2020 | |
| WO | 2022066294 A1 | 3/2022 | |
| WO | WO-2022056380 A1 * | 3/2022 | ......... G02B 27/0176 |

* cited by examiner

DEVICES WITH DETACHABLE HEADBANDS

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

A head-mounted device may have a head-mounted housing. The head-mounted housing may have displays that display images for a user when the head-mounted housing is worn by the user. A headband may be removably coupled to the head-mounted housing. When the user is wearing the head-mounted device, the headband may help hold the head-mounted housing against the face of the user. The headband may be removed and replaced with a different headband when desired.

The head-mounted device may have housing structures such as elongated housing members with protruding posts. The headband may have a strap. Opposing ends of the strap may be provided with openings that are configured to receive the posts.

Releasable latches may be used to allow selective engagement and disengagement between the headband and the housing. The latches may contain movable latch members that are biased using magnetic biasing mechanisms, spring-based biasing mechanisms, or other biasing mechanisms. To release a latch, a tab, button, toggle lever, slider, or other release mechanisms may be moved by a user. This moves the movable latch members from a closed latch position in which the housing is secured to the headband to an open latch position that releases the headband from the housing.

DETAILED DESCRIPTION

Head-mounted devices include head-mounted support structures that allow the devices to be worn on the heads of users. The head-mounted support structures may include device housings that enclose components such as displays. The displays may be used for presenting a user with visual content. The head-mounted support structures for a head-mounted device may also include headbands and other structures that help hold a device housing on the face of a user. The headband of a head-mounted device may be removable. This allows users to swap different headbands into use to accommodate different head sizes and/or to update the style of headband being used.

Figure 1:
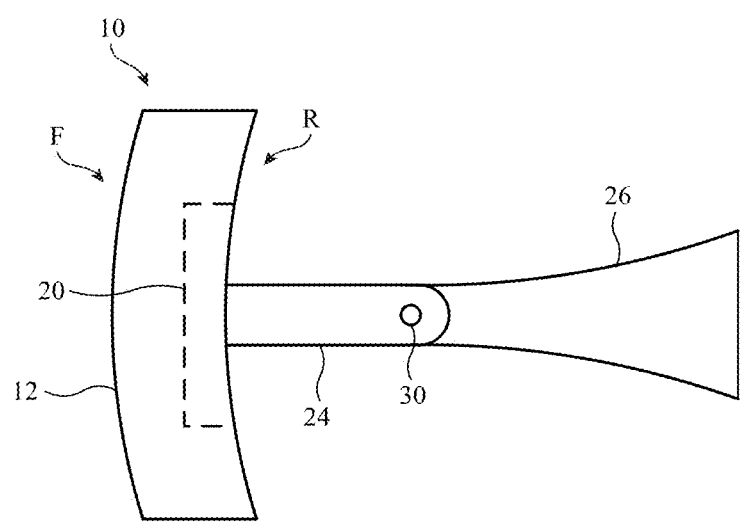
FIG. 1 is a side view of an illustrative electronic device such as a head-mounted display device with a detachable headband in accordance with an embodiment.

FIG. 1 is a side view of an illustrative head-mounted electronic device with a detectable headband. As shown in FIG. 1, head-mounted device 10 may include head-mounted housing 12 (sometimes referred to as a main housing, main housing unit, head-mounted support structure, main housing portion, etc.). Housing 12 may have walls or other structures that separate an interior housing region from an exterior region surrounding housing 12. For example, housing 12 may have walls formed from polymer, glass, metal, and/or other materials. Electrical and optical components may be mounted in housing 12. These components may include components such as integrated circuits, sensors, control circuitry, input-output devices, etc.

To present a user with images for viewing from eye boxes (e.g., eye boxes in which the user's eyes are located when device 10 is being worn on the users' head), device 10 may include displays and lenses. These components may be mounted in optical modules 20 that face towards rear R of device 10 or may be mounted in other supporting structures in housing 12 to form respective left and right optical systems. There may be, for example, a left display for presenting an image through a left lens to a user's left eye in a left eye box and a right display for presenting an image to a user's right eye in a right eye box.

If desired, housing 12 may have forward-facing components such as cameras and other sensors on front F for gathering sensor measurements and other input and may have a soft cushion on opposing rear R. Rear R may have openings that allow the user to view images from left and right optical modules 20 (e.g., when rear R is resting on the front of the user's head). Device 10 may have a strap such as headband 26 and, if desired, may have other structures (e.g., an optional over-the-head strap) to help hold housing 12 on the user's head. Headband 26 may have a fixed length or may be adjustable. Headband 26 may have first and second ends coupled, respectively, to the left and right sides of housing 12. In the example of FIG. 1, coupling members 24, which serve as extensions of housing 12, are provided on the left and right sides of housing 12. Members 24 may be formed from rigid materials such as rigid polymer and/or other materials and may contain sensors, buttons, speakers, and other electrical components. Hinges and/or other mechanisms may be used to couple members 24 to housing 12 or members 24 may be formed as integral portions of a main housing unit. The ends of headband 26 may have coupling mechanisms such as openings configured to receive posts 30 (pins) or other protrusions on members 24 or other housing structures. In an illustrative configuration, these posts face inwardly towards the user's head and are not visible to people in the vicinity of device 10 when device 10 is being worn by the user. Releasable latch mechanisms can be used to help secure the ends of headband 26 to member 24. For example, a first detachable latch may be used to removably couple the left end of headband 26 to a left post in a left member 24 on a left side of housing 12 and a second detachable latch may be used to removably couple the right end of headband 26 to a right post in a right member 24 on a right side of housing 12. If desired, a user may flip the headband over so that the first detachable latch removable couples the end of headband 26 that was previously coupled to the left post to the right post and so that the second detachable latch removably couples the end of headband 26 that was previously coupled to the right post to the left post (e.g., the user may flip the left and right sides of the band without flipping the band inside out). A user may open and close the latches when housing 12 is being worn or, in an illustrative configuration that is sometimes described herein as an example, a user may open and close the latches when housing 12 is not being worn.

The use of latch-based coupling mechanisms in device 10 may help allow a user to removably attach headband 26 to members 24 and thereby removably attach headband 26 to housing 12. Members 24 may have elongated shapes of the type shown in FIG. 1 and/or other suitable shapes and may sometimes be referred to as rigid straps, rigid coupling members, power straps head-mounted device housing structures, elongated head-mounted device housing members, elongated housing structures, elongated housing members, or head-mounted device housing members (as examples).

Headband 26 may have soft flexible portions and/or rigid portions. As an example, a central portion of headband 26 may be formed from stretchable fabric. Left and right end portions of headband 26 may be coupled to opposing ends of this central portion. The left and right end portions may, as an example, have stiffening structures (e.g., the left and right end portions may be stiffer than the central stretchable portion). Other types of configuration may be used for headband 26, if desired (e.g., arrangements with adjustable tensioning cables, etc.).

Figure 2:
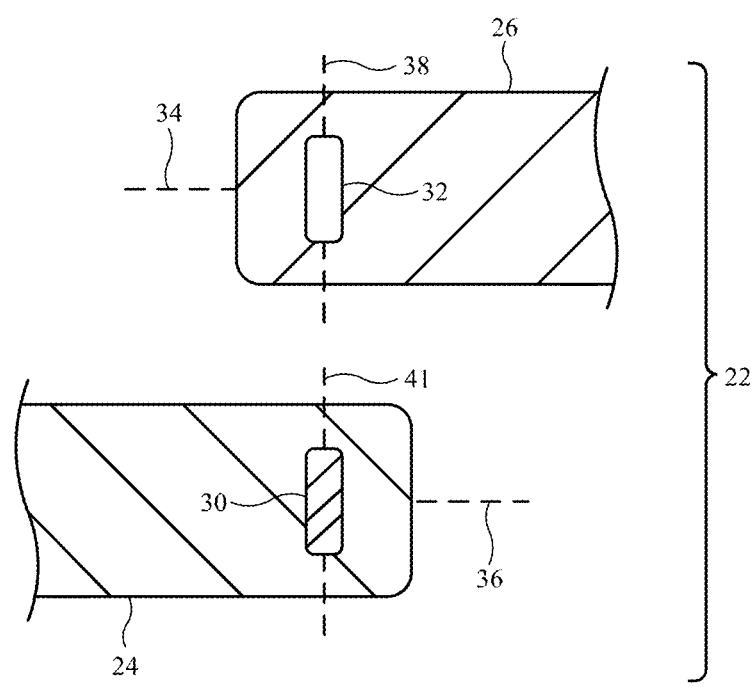
FIG. 2 is a view of an illustrative detachable headband and associated head-mounted device housing structure in accordance with an embodiment.

FIG. 2 is a diagram of an end portion of an illustrative headband 26 and a corresponding end portion of an illustrative member 24. Headband 26 and housing structures such as members 24 may sometime be collectively referred to as a forming a head-mounted device headband system (headband system 22). As shown in the example of FIG. 2, member 24 may have a protruding post such as post 30 (e.g., a post that protrudes out of member 24 towards a user head while device 10 is being worn by a user). Headband 26 may have a corresponding opening 32 that is configured to receive post 30.

Opening 32 may be a through-hole opening with a shape that matches the outline of post 30. In the present example, post 30 and opening 32 have elongated shapes when viewed end-on (e.g., rectangular shapes with rounded corners). These elongated shapes may help resist rotational motion between longitudinal axis 34 of headband 26 and longitudinal axis 36 of member 24. This helps prevent headband 26 from slipping up or down along the rear surface of a user's head during use. In general, post 30 and/or mating opening 32 may have any suitable shapes (e.g., the shape of post 30 and/or opening 32 may be circular, oval, rectangular, triangular, may be a shape with curved edges and/or straight edges, may be a shape with drafted edges to help with alignment and/or insertion, etc.). The use of rectangular shapes with rounded corners and/or other shapes that are elongated (e.g., along respective longitudinal axes 41 and 38 of FIG. 2, respectively), is illustrative.

Figure 3:
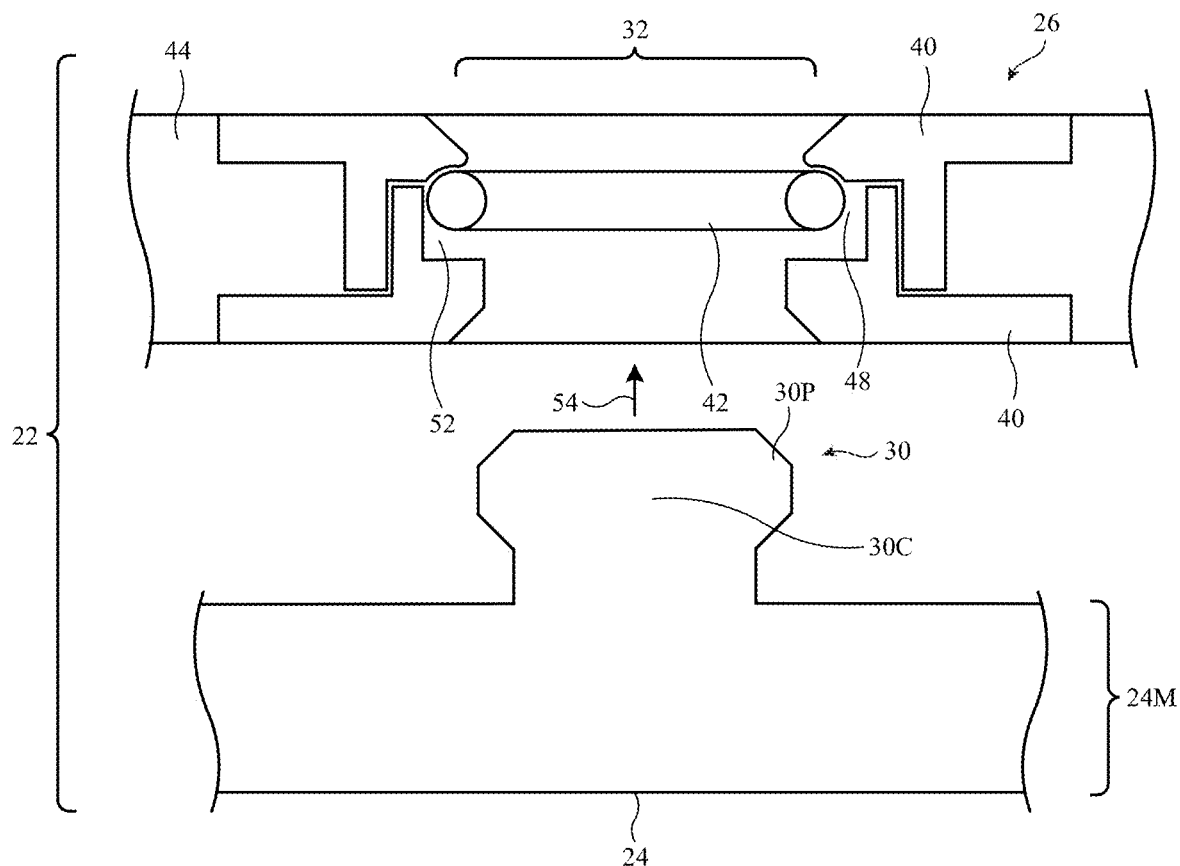
FIG. 3 is a cross-sectional side view of a portion of an illustrative detachable headband and associated housing structure in accordance with an embodiment.

FIG. 3 is a cross-sectional side view of system 22. As shown in FIG. 3, member 24 may have main portion 24M. Main portion 24M may serve as a support for post 30 and may be formed from rigid polymer, metal, fabric, carbon-fiber composite materials, and/or other materials. Post 30 may be attached to main portion 24M and may protrude inwardly (or, in some embodiments, outwardly) from portion 24M. Post 30 may be formed from metal, rigid polymer, other materials, and/or combinations of these materials. Post 30 may have main portion 30C, which protrudes away from the surface of portion 24M. Post 30 may also have a peripheral protruding portion such as peripheral protruding portion 30P. Portion 30P may, as an example, run along the periphery of post 30 and may protrudes radially outward from main portion 30C. In the example of FIG. 3, protruding portion 30P has bevels to facilitate entry of post 30 into opening 32 of headband 26 in direction 54 and to facilitate removal of post 30 from opening 32 in the opposite direction when detaching headband 26 from member 24.

Headband 26 has a main strap portion 44. Strap portion 44, which may sometimes be referred to as a strap or headband member, may have internal stiffening members, external fabric coverings and or other covering layers, strips of strengthening fabric, stretchable fabric portions (e.g., stretchable knit fabric), cosmetic coverings, and/or other headband structures. Through-hole opening 32 may be formed by cutting or otherwise forming an opening in portion 44. The periphery of opening 32 may be strengthened using a mating pair of ring members 40. Members which may sometimes be referred to as a cap and socket, may have ring shapes and may capture portions of strap 44. Members 40 may be attached to each other using laser welding and/or other attachment mechanisms. Adhesive may optionally be used to help secure members to strap 44.

When members 40 are attached to each other, a ring shaped recess such as recess 52 is formed. Spring 42 (e.g., a spring formed from metal, foam, stretchy rubber gasket material or other elastomeric material, and/or other spring structures) may have a ring shape surrounding opening 32 and may be received within recess 52. Gap 48 may be formed on one side of spring 42. As shown in the top view of spring 42 of FIG. 4, the presence of gap 48 allows spring 42 to expand outwardly in direction 56 when post 30 is inserted within opening 32 and the bevels on protruding portion 30P press spring 42 radially outward. Once post 30 has been inserted within opening 32 sufficiently for protruding portion 30P to have passed spring 42, spring 42 may contract inwardly against main portion 30C, thereby retaining post 30 within opening 32 and securing headband 26 to member 24. When it is desired to remove headband 26, headband 26 may be pulled away from member 24. During headband removal, the bevels on portion 30P press against spring 42 and expand spring 42 radially, thereby allowing post 30 to be removed from opening 32.

Figure 4:
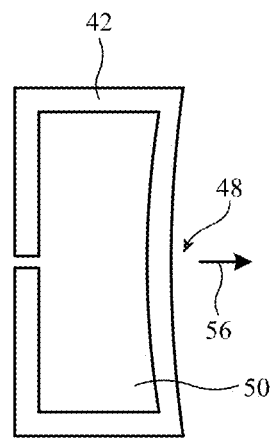
FIG. 4 is a top view of an illustrative spring that may be used in a detachable headband of the type shown in FIG. 3 in accordance with an embodiment.
Figure 5:
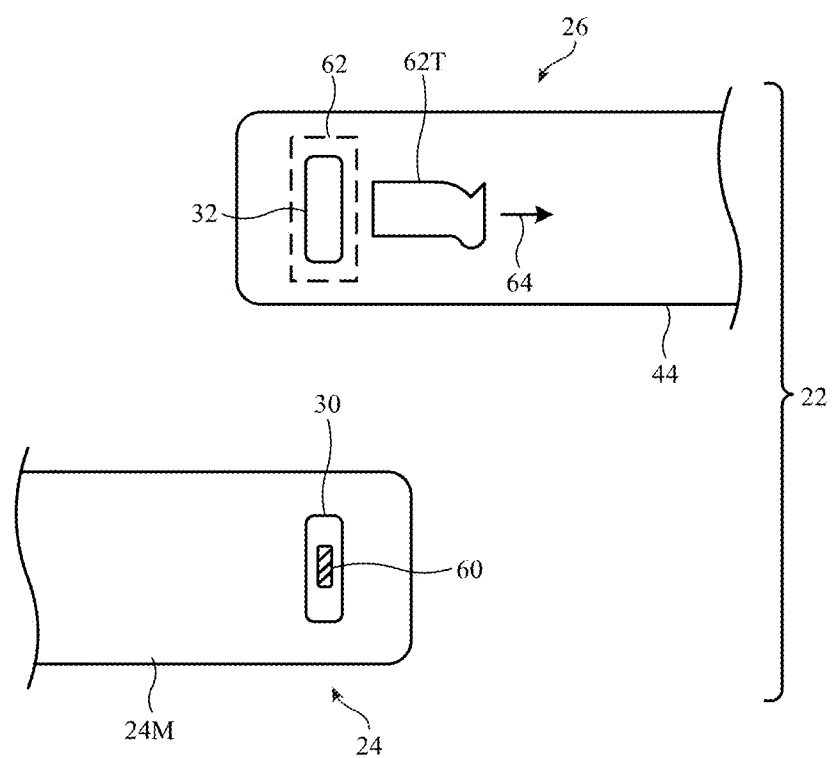
FIG. 5 is a diagram of an illustrative detachable headband having a latch with a release tab in accordance with an embodiment.

The illustrative spring-based headband retention arrangement of FIGS. 3 and 4 allows headband 26 to be attached and detached from member 24. If desired a latch-based mechanism maybe used to secure and release headband 26. This type of arrangement is shown in FIG. 5. As shown in the example of FIG. 5, system 22 may include a latching mechanism such as latch 62. Latch 62, which may sometimes be referred to as a latch mechanism or latch structures, may be opened and closed using magnets, springs, sliding members, toggling members, rotating members such as knobs, buttons, and/or other latch structures that may be manipulated by a user (e.g., a user's fingers). In the example of FIG. 5, the latch of headband 26 has a movable latch member that engages post 30 when post 30 is within opening 32 and has an associated release mechanism such as release tab 62T. Tab 62T, which may be formed from a flexible strip of material (e.g., fabric, polymer, and/or other material) may be pulled in direction 64 by a user (e.g., when a user grasps tab 62T between the user's fingers), thereby moving the movable latch member out of engagement with post 30. This releases post 30 and allows post 30 to be removed from opening 32. Magnets, spring structures, and/or other biasing structures may be used in closing the latch. In some embodiments, member 24 and headband 26 may have magnets that facilitate attachment of headband 26 and member 24. As shown in FIG. 5, for example, post 30 may have one or more magnets such as magnet 60. Magnet 60 may be used to attract and/or repel corresponding magnets in strap 44, which can assist in attaching headband 26 to member 24 and/or can assist in closing latch 62.

Figure 6:
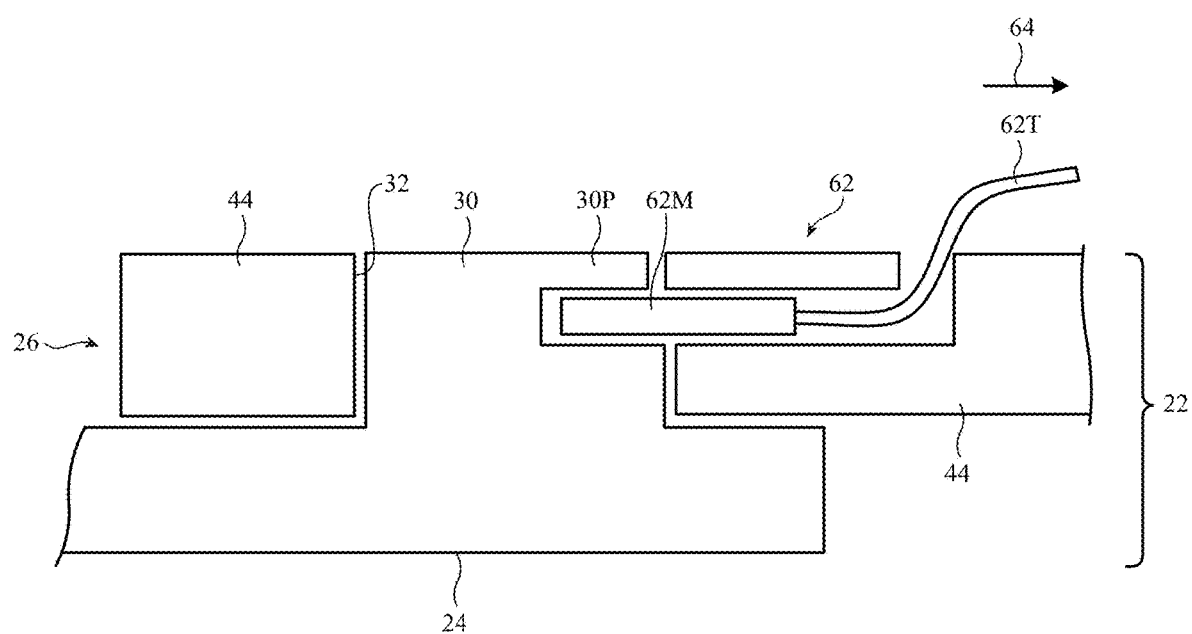
FIG. 6 is a cross-sectional side view of an illustrative detachable headband with a release tab in accordance with an embodiment.

FIG. 6 is an illustrative side view of system 22 in a configuration in which latch 62 has a release tab. Tab 62T may be attached to slidable (movable) latch member 62M. Latch member 62M may be moved laterally towards post 30 in response to magnetic force, spring force, or other biasing force from a latch member biasing mechanism so that the tip of the member 62M protrudes under a lip portion (portion 30P) of post 30. In this way, post 30 is retained within opening 32 until latch 62 is released (e.g., by pulling on tab 62T in direction 64).

Figure 7:
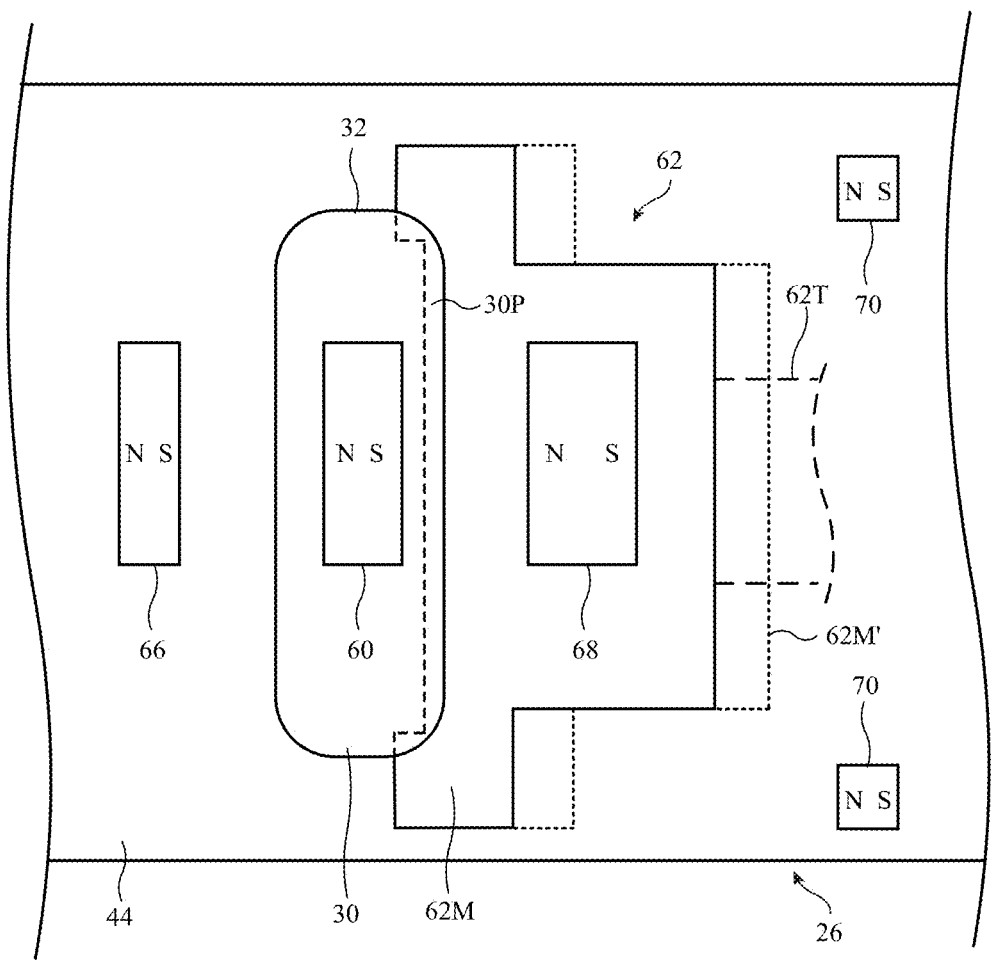
FIG. 7 is a top view of an illustrative magnet arrangement for use with a detachable headband and associated housing structure in accordance with an embodiment.

FIG. 7 is a top view of system 22 in an illustrative configuration in which post 30 of member 24 and headband 26 have magnets. Post 30 has magnet 60. Strap 44 of headband 26 has magnets 66, 68, and 70. When post 30 is inserted within opening 32 of headband 26, magnet 60 lies between magnets 66 and 68. In this configuration, the south pole of magnet 60 attracts the north pole of magnet 68. Magnet 68 is attached to slidable latch member 62M. The magnetic attraction between magnet 60 and magnet 68 pulls latch member 62M towards post 30 until the tip of latch member 62M is received under protruding portion (lip) 30P of post 30 (as shown in FIG. 6). In this position, latch 62 is closed and post 30 is retained within opening 32 (i.e., headband 26 is attached to member 24).

When post 30 is not inserted in opening 32, the south poles of magnets 70 attract the north poles of magnet 68 and vice versa, so that magnet 68 aligns with magnet 70 when post 30 is not present. Magnets 70 are attached to strap 44, whereas magnet 68 is attached to slidable latch member 62M. Due to the magnetic attraction between magnets 70 and magnet 68, 70, member 62M is moved to open latch position 62M'. This ensures that the tip of member 62M that faces opening 32 will not protrude into opening 32 in the absence of post 30 and will therefore not visible within opening 32. The magnetic retraction of latch member 62M thereby helps enhance the visual appearance of headband 26 when headband 26 is not attached to member 24 and latch 62 is open.

When a user desires to attach headband 26 to member 24, the user places opening 32 of headband 26 adjacent to post 30. As opening 32 moves towards post 30, the south pole of magnet 66 attracts the north pole of magnet 60 while the north pole of magnet 68 attracts the south pole of magnet 60 in an almost perfectly symmetrical fashion, so that the force exhibited on post 30 feels balanced. This tends to align post 30 with opening 32 and pull post 30 into opening 32, thereby reducing the need for the user to accurately align post 30 with opening 32.

The illustrative example of FIG. 7 uses magnetic force for three different functions. Firstly, while headband 26 and member 24 are detached, magnetic force is used to automatically retract latch member 62M into position 62M'. This automatic magnetic latch opening mechanism helps maintain latch member 62M out of opening 32 when not in use. Secondly, when a user is first attaching headband 26 to member 24, magnetic attraction is used to guide post 30 into opening 32 without excessive user attention. Thirdly, after post 30 has been received within opening 32, magnetic attraction is used to pull latch member 62M towards post 30 under protruding (lip) portion 30P, thereby magnetically closing latch 62.

Other biasing mechanisms may be used to supplement magnetic biasing mechanisms such as these and/or may be used in place of magnetic biasing arrangements. Consider, as an example, the illustrative spring-based biasing mechanisms of FIGS. 8, 9, 10, and 11.

Figure 8:
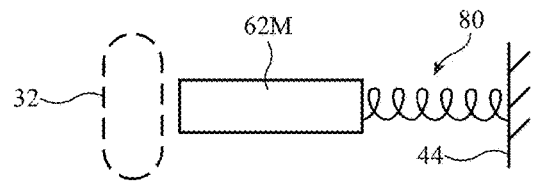
FIGS. 8, 9, and 10 are diagrams showing illustrative latch biasing mechanisms in accordance with embodiments.

As shown in FIG. 8, latch member 62M may be biased using biasing member 80. Biasing member 80 may be a spring (e.g., a compression spring formed from metal or other springy material, etc.), may be a spring formed from elastomeric material (e.g., polymer foam), and/or may be formed from other spring structures that exhibit spring force. Member 80 of FIG. 8 may be used, for example, to push away from strap 44 and thereby push latch member 62M into engagement with post 30 when post 30 has been received within opening 32. Compression springs or other expanding biasing members may be used to move any suitable movable structures associated with latch 62 (e.g., member 62M and/or other movable members).

Figure 9:
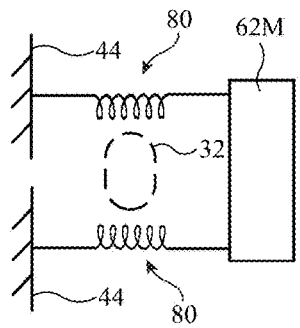

As shown in FIG. 9, biasing members 80 may be used in tension (e.g., members 80 may be tension springs). In the illustrative configuration of FIG. 9, members 80 are pulling member 62M towards opening 32. Tension springs or other tensioned biasing members may, in general, pull on any suitable latch structures in latch 62.

Figure 10:
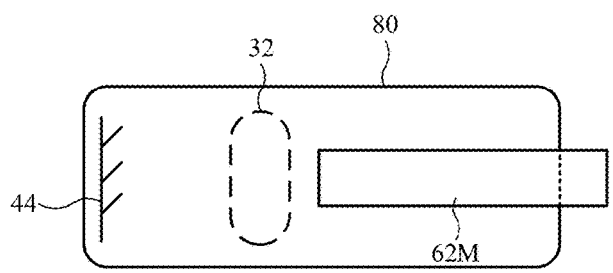
Figure 11:
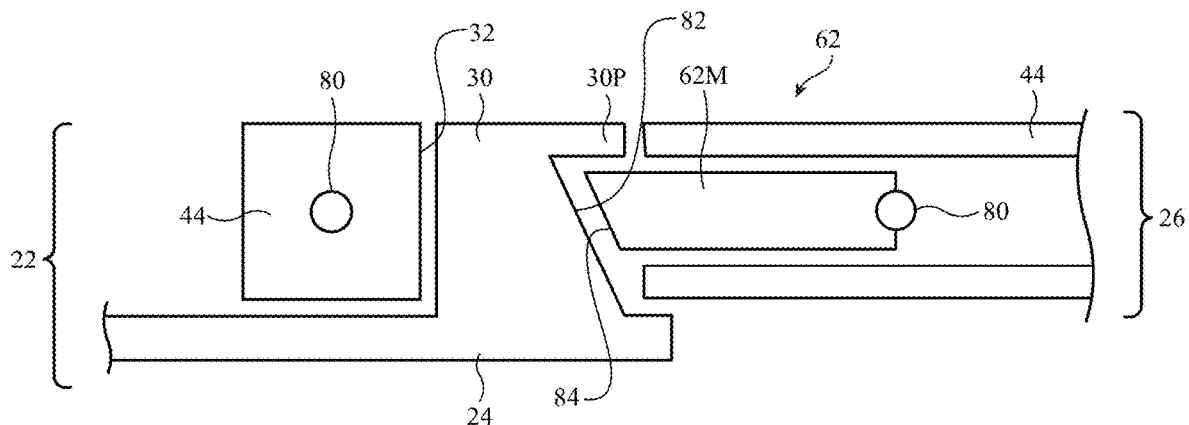
FIG. 11 is a cross-sectional side view of an illustrative latch biasing mechanism in accordance with an embodiment.

FIGS. 10 and 11 illustrate the use of a spring formed from an elastomeric band. As shown in the top view of FIG. 10, for example, spring member 80 (e.g., an elastomeric band having a ring shape) may extend between a portion of headband 26 (e.g., strap 44) and latch member 62M. When member 62M is moved away from opening 32, member 80 is stretched. This creates an opposing restoring spring force that tends to pull member 62M towards opening 32, allowing member 62M to engage post 30 in opening 32. This type of elastomeric band spring biasing mechanism is further illustrated in the cross-sectional side view of system 22 of FIG. 11. As shown in FIG. 11, biasing member 80 (e.g., a spring formed from an elastomeric band) may have a ring shape that extends (on the left) through a portion of strap 44 and (on the right) through a grooved portion of latch member 62M. Post 30 may have a protruding portion such as portion 30P that creates a post recess (recess 82) into which latch member 62M can be received when latch 62 is closed. When it is desired to open latch 62, a release tab or other release mechanism that is coupled to member 62M may pull the tip of latch member 62M out of recess 82. This releases protruding portion 30P from the tip of latch member 62M and thereby unlocks latch 62 so that post 30 can be removed from opening 32. At the same time, moving latch member 62M away from opening 32 tensions member 80. When it is desired to attach headband 26 to member 24, this tension can be used to move member 62M into recess 82, so that member 62M engages post 30.

In the illustrative latch arrangement of FIG. 11, latch member 62M has a cam surface such as angled surface 84. This surface may interact with protruding portion 30P. For example, as post 30 is being inserted into opening 32, portion 30P may bear against surface 84 and thereby force latch member 62M away from post 30 to open latch 62. Once portion 30P has moved across all of surface 84, latch member 62M may move into recess 82 under the latch-closing biasing force of biasing member 80.

Figure 12:
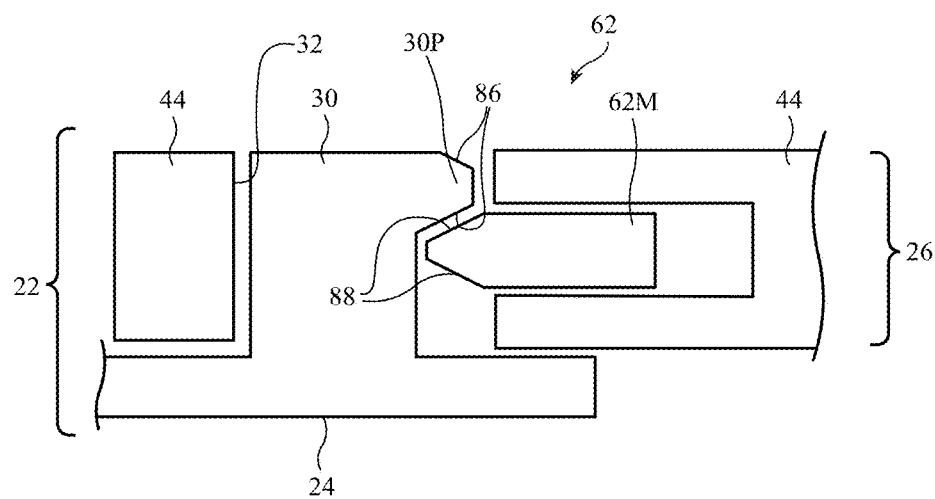
FIGS. 12 and 13 are cross-sectional side views of illustrative detachable headbands in accordance with embodiments.

FIG. 12 shows how latch member 62M may have both outwardly and inwardly facing cam surfaces 88. Protruding portion 30P may have corresponding outwardly and inwardly cam surfaces 86. With this type of arrangement, the outwardly facing cam surface of protrusion 30P may bear against the inwardly facing cam surface of latch member 62M when post 30 is being inserted into opening 32, thereby moving latch member 62M away from post 30 to place latch 62 in its open state. After inserting post 30 in opening 32, the biasing mechanism that is being used to close latch 62 (e.g., magnetic biasing, spring biasing, etc.) pushes latch member 62M toward post 30 and engages protrusion 30P to hold post 30 in place in opening 32. When a user desires to remove headband 26 from member 24, the user may pull headband 26 and member 24 apart, causing the inwardly facing cam surface 86 of protruding portion 30P to bear against the outwardly facing cam surface 88 of latch member 62M and thereby push latch member 62M into its open position. Because a pulling force from a user is used to disengage member 24 and headband 26 in systems such as system 22 of FIG. 12, these systems may sometimes be referred to as pull-to-release systems (e.g., latch 62 of FIG. 12 may be referred to as a pull-to-release latch). Any suitable latch closing mechanism may be used with this type of latch (e.g., member 62M may be biased towards post 30 using magnetic biasing, metal spring biasing, elastomeric band spring biasing, etc.

Figure 13:
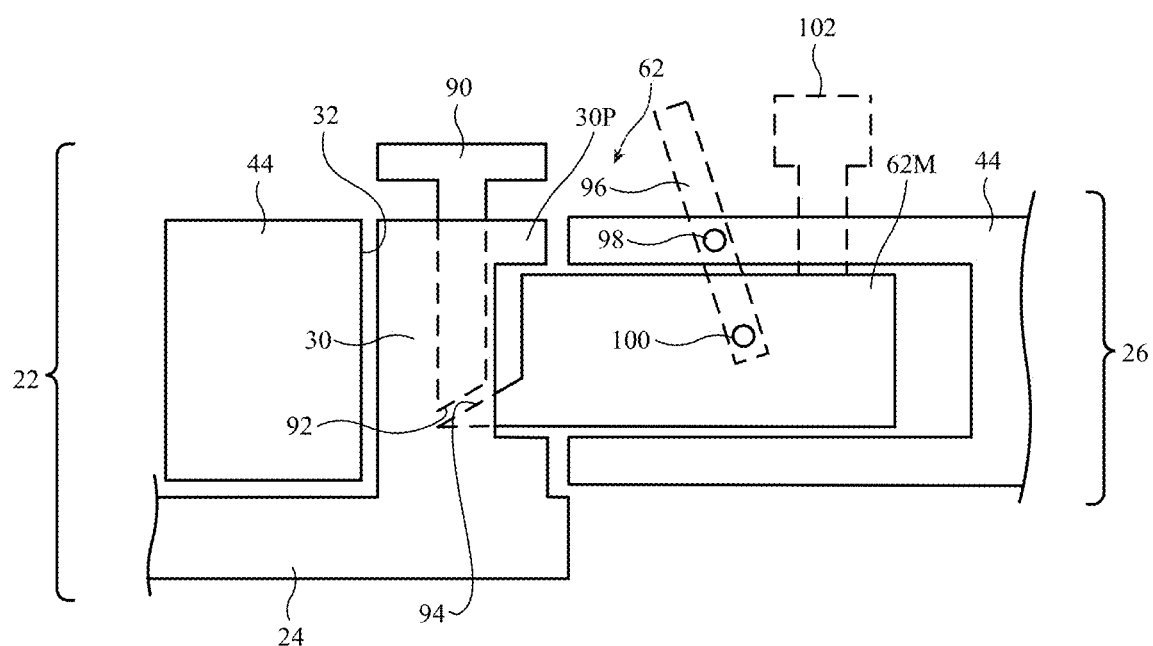

In addition to or instead of using a pull-to-release mechanism to release latch 62, latch 62 may be provided with one or more of the illustrative latch release mechanisms of FIG. 13. As shown in FIG. 13, latch 62 may have a movable latch member such as latch member 62M that has a cam surface such as cam surface 94. A biasing mechanism (magnetic, spring-based, etc.) may be used to push latch member 62M into its closed position in which latch member 62M engages protruding portion 30P of post 30 and holds member 24 and headband 26 together.

With one illustrative latch release mechanism, latch 62 uses a push-button release mechanism. With this arrangement, latch 62 is provided with a button. The button may have a movable button member such as button member 90 that is coupled to post 30. When a user desires to release latch 62, the user may press inwardly on button member 90, to move button 90 inwardly and cause button member cam surface 92 to bear against cam surface 94 of latch member 62M. This pushes latch member 62M away from post 30 and thereby opens the latch so that post 30 can be removed from opening 32.

In another illustrative latch release arrangement, latch 62 is provided with a toggle release mechanism. As shown in FIG. 13, for example, toggle lever 96 may be coupled to latch member 62M by pivoting connection 100 and may be coupled to structures in strap 44 of headband 26 by pivoting connection 98. This allows a user to move latch member 62M to its open position (disengaged from post 30) by flipping lever 96.

In yet another illustrative latch release arrangement, a slider mechanism may be used for latch release operations. As shown in FIG. 13, for example, slider member 102 may be attached to latch member 62M. With this arrangement, a user may open latch 62 by sliding member 102 (and thereby sliding latch member 62M) away from post 30.

Additional latch release arrangements may be used, if desired (e.g., release mechanisms based on pull tabs, rotating knobs, push buttons, pull buttons, sliders, toggle switches, other release structures and/or combinations of these structures). These latch release arrangements may be used with any suitable latch-biasing scheme (e.g., arrangements in which latch member 62M is biased towards its closed position magnetically, using a metal spring, using a tension spring, using a compression spring, using a coil spring, using a leaf spring, using a spring based on a stretchable band such as an elastomeric ring, and/or other spring, using a biasing device based on compressible foam, etc.). There may be a single latch member 62M in latch 62 or multiple latch members 62M may be used in latch 62.

Figure 14:
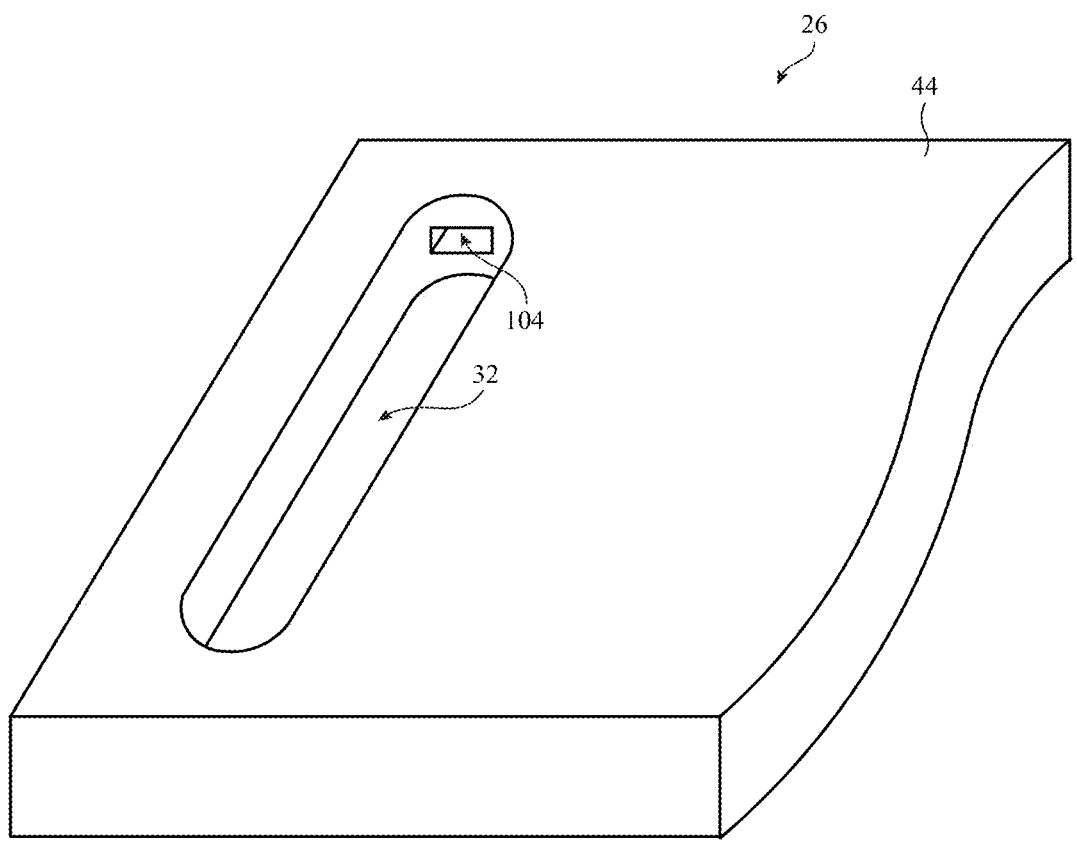
FIG. 14 is a perspective view of an illustrative detachable headband with recesses configured to receive latch members in accordance with an embodiment.

FIG. 14 is a perspective view of headband 26 in an illustrative configuration in which strap 44 has latch member recesses 104. Recesses 104 may be formed on opposing sides of opening 32 and may be configured to receive respective latch members that are located on opposing sides of post 30. With this type of arrangement, the latch members are retracted into post 30 to open latch 62 and are extended out of post 30 into openings 104 of headband strap 44 to close latch 62.

Figure 15:
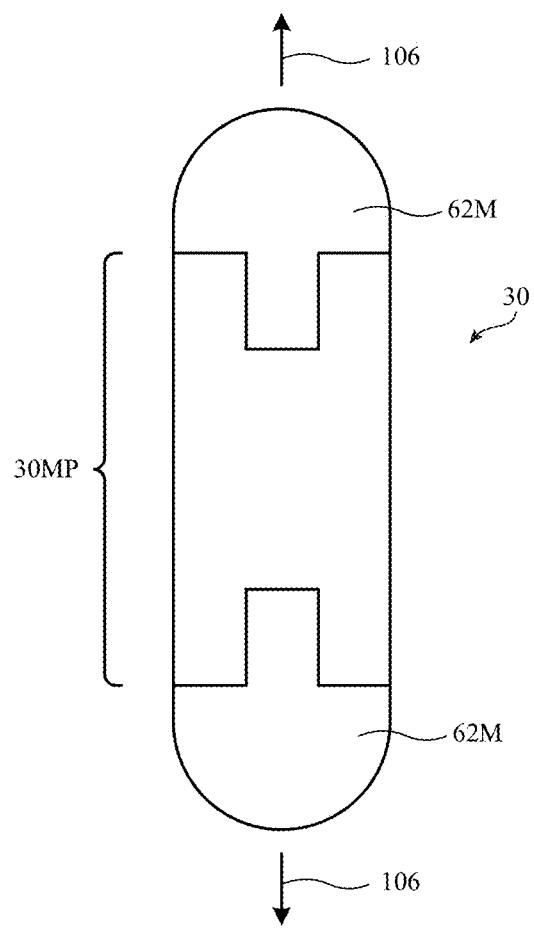
FIG. 15 is a top view of an illustrative headband attachment post having movable latch members in accordance with an embodiment.

FIG. 15 is a top view of an illustrative post for member 24 that has movable latch members 62M for forming latch 62. In this example, post 30 has a main portion 30MP to which latch members 62M are slidably coupled. When it is desired to release headband 26 from member 24, movable post latch members 62M are placed in the retracted position shown in FIG. 15. After inserting post 30 into opening 32 of strap 44 of headband 26, latch members 62M may be moved outwardly in directions 106. This causes latch members 62M to move into openings 104 of strap 44 of FIG. 14, thereby closing the latch and securing headband 26 to member 24.

Figure 16:
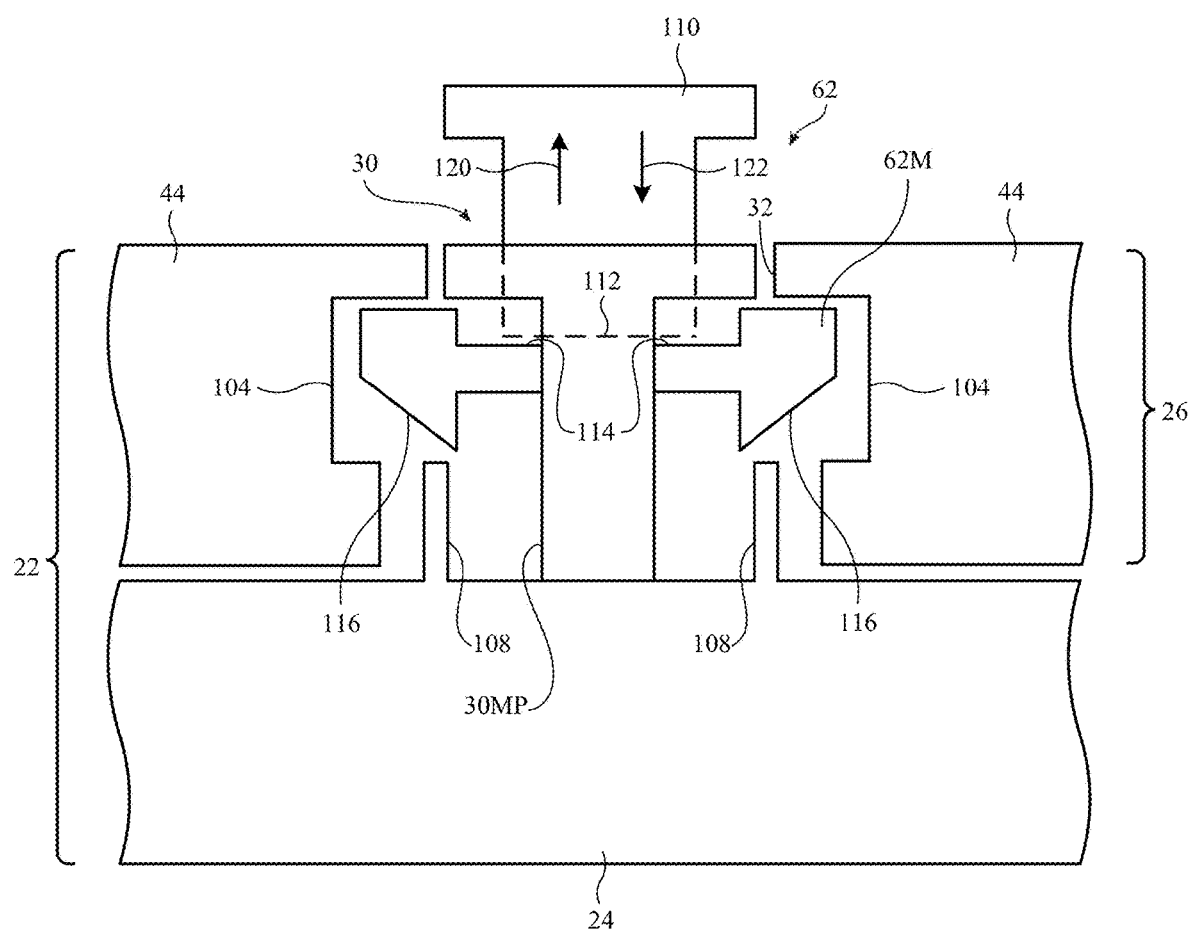
FIG. 16 is a cross-sectional side view of an illustrative headband attachment post having movable latch members in accordance with an embodiment.

A cross-sectional side view of an illustrative system based on a strap of the type shown in FIG. 14 and a post with latch members of the type shown in FIG. 15 is shown in FIG. 16. As shown in FIG. 16, latch 62 may have movable latch members 62M that are slidably coupled to post 30 (e.g., in slots in main post portion 30MP). Each latch member 62M may have a biasing mechanism (magnetic, spring-based, etc.) that pushes that member outwardly into a corresponding strap recess 104 in strap 44 of headband 26 when post 30 is inserted into opening 32. This closes latch 62 and secures headband 26 to member 24.

Latch 62 may have a button release or other release mechanism. As shown in FIG. 16, for example, button member 110 may be coupled to post 30 and may move in and out with respect to main post portion 30MP. When the biasing mechanisms coupled to latch members 62M are pushing members 62M to their greatest outward extend (away from each other), cam surfaces 116 of members 62M bear against structures 108 (e.g., a hollow tube or other structure coupled to member 24). This forces latch members 62M in upward direction 120. When it is desired to release latch 62, a user may press on button member 130. This causes button member 130 to move inwardly in direction 122, so that button member surface 112 bears against surfaces 114 of latch members 62M, causing cam surfaces 116 of latch members 62M to bear against structures 108. As cam surfaces 116 interact with structures 108 under pressure in direction 122 from button member 110, latch members 62M are forced inwardly towards each other (overcoming their outward biases). Once latch members 62M have been fully retracted into post 30, latch members 62M will become disengaged with recesses 104 of strap 44, thereby allowing strap 44 to be removed from post 30.

Figure 17:
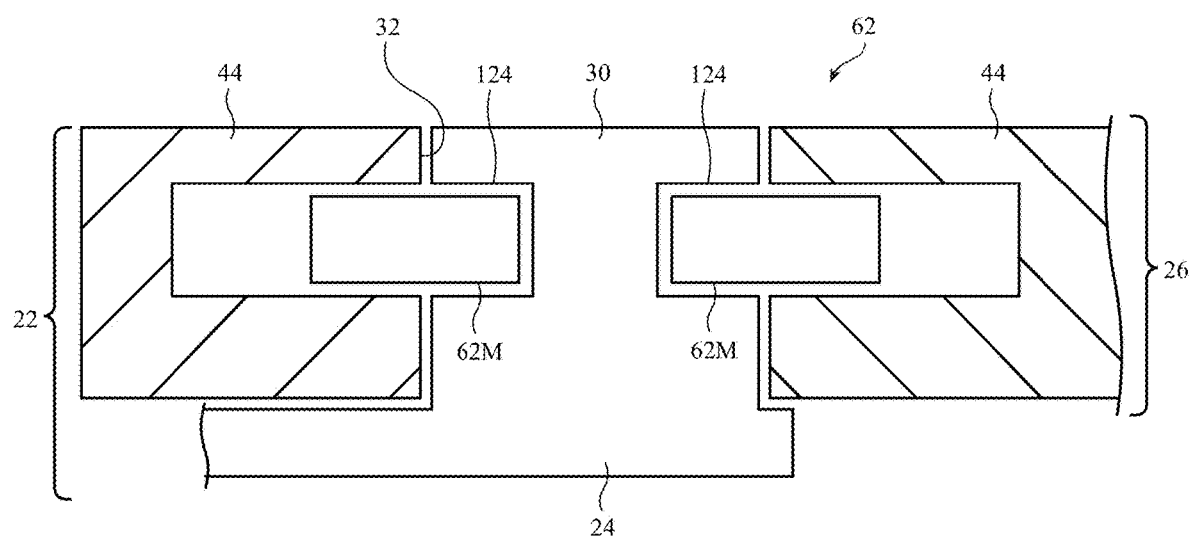
FIG. 17 is a cross-sectional side view of an illustrative headband attachment post with a recess and a corresponding detachable headband with a pair of opposing latch members that can be moved into the recess in accordance with an embodiment.

In the example of FIG. 16, recesses 104 are located in strap 44. If desired, recesses for receiving latch members 62M may be located in post 30. Consider, as an example, the arrangement shown in the cross-sectional side view of system 22 of FIG. 17. As shown in FIG. 17, latch members 62M may be slidably coupled to strap 44 of headband 26 (e.g., latch members 62M may slide back and forth laterally within recesses in strap 44). Biasing mechanisms (magnetic biasing structures, spring-based biasing structures, etc.) may be used to bias latch members 62M towards post 30. Post 30 may have one or more recesses 124 that are configured to receive latch members 62M. When latch members 62M are biased into recesses 124, post 30 will be retained within opening 32 and headband 26 will therefore be secured to member 24. When it is desired to release latch 62, members 62M may be moved out of post recesses 124 (e.g., using a release mechanism based on a press or pull button, a sliding button, a toggling button, a pull tab, etc.). Recess 124 may extend around the entire periphery of post 30 or there may be one or more recesses 124 located at different locations about the periphery of post 30, each of which is aligned with a respective member 62M.

Although sometimes described herein in the context of examples where posts 30 are formed on members 24 and openings 32 are formed in headband 26, posts 30 may, if desired, be formed as part of headband 26 and openings 32 may be formed in members 24.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A headband system operable with a head-mounted device having displays configured to display images to eye boxes, the headband system comprising:
    a headband having an opening and a strap;
    a head-mounted device housing structure having a post configured to be received within the opening;
    a latch having a latch member configured to move between an open position in which the latch member does not engage the post and a closed position in which the latch member engages the post and secures the headband to the head-mounted device housing structure, wherein the latch comprises a magnetic biasing mechanism with a first magnet on the post that is configured to magnetically attract a second magnet on the latch member to bias the latch member towards the post when the latch member is in the closed position; and
    a third magnet on the strap that is configured to magnetically attract the first magnet to pull the post into the opening.

2. The headband system defined in claim 1 wherein the head-mounted device has a main housing portion in which the displays are located, and wherein the head-mounted device housing structure comprises an elongated housing member extending from the main housing portion.

3. The headband system defined in claim 2 further comprising a fourth magnet on the strap that is configured to magnetically attract the second magnet and thereby pull the latch member away from the opening when the post is not in the opening.

4. The headband system defined in claim 3 wherein the first magnet is between the second magnet and the third magnet when the post is in the opening.

5. The headband system defined in claim 4 further comprising a release tab coupled to the latch member.

6. The headband system defined in claim 5 wherein the release tab is formed from a flexible strip of material configured to be pulled to move the latch member from the closed position to the open position.

7. The headband system defined in claim 1 further comprising a latch release mechanism.

8. The headband system defined in claim 7 wherein the latch release mechanism comprises a button configured to move the latch member away from the closed position towards the open position.

9. The headband system defined in claim 7 wherein the latch release mechanism comprises a latch release mechanism selected from the group consisting of: a latch release mechanism having a slider coupled to the latch member, a latch release mechanism having a pivoting toggle lever coupled to the latch member, and a latch release mechanism having a release tab coupled to the latch member.

10. A head-mounted device operable with a headband, comprising:
    a head-mounted device housing structure;
    a post coupled to the head-mounted device housing structure, wherein:
        the post is configured to be received within an opening in the headband, wherein the post comprises a recess; and
        a movable latch member configured to move between:
            a retracted position that allows the headband to be detached from the head-mounted device housing structure; and
            an extended position in which the movable latch member is received within the recess in the post and retains the headband on the post.

11. The head-mounted device defined in claim 10 wherein the post has a latch member biasing mechanism configured to bias the movable latch member towards the extended position and has a release mechanism configured to retract the movable latch member into the post.

12. A head-mounted device headband operable with a head-mounted device housing, wherein the head-mounted device housing contains displays and has first and second protruding portions, wherein the head-mounted device headband comprises:
    a strap having opposing ends with respective first and second openings that are respectively configured to receive the first and second protruding portions;
    a first releasable latch configured to secure the first protruding portion within the first opening;
    a release tab coupled to the first releasable latch, wherein the release tab comprises a flexible strip of material that is configured to be pulled to release the first releasable latch; and
    a second releasable latch configured to secure the second protruding portion within the second opening.

13. The head-mounted device headband defined in claim 12 wherein the first and second protruding portions comprise respective first and second posts, wherein the first and second releasable latches comprise, respectively, first and second movable latch members each of which is configured to move between an open position and a closed position, wherein in the open position, the first and second movable latch members do not engage the first and second posts, and wherein in the closed position the first and second movable latch members respectively engage the first and second posts to secure the strap to the first and second posts.

14. The head-mounted device headband defined in claim 13 wherein the first and second releasable latches comprise respective first and second magnetic biasing mechanisms that respectively move the first and second movable latch members towards the first and second posts.

\* \* \* \* \*